US010875997B2

(12) United States Patent
De Velder et al.

(10) Patent No.: US 10,875,997 B2
(45) Date of Patent: Dec. 29, 2020

(54) BLENDS OF LIQUID EPOXY AND SOLID PHENOXY RESINS

(71) Applicant: MOMENTIVE SPECIALITY CHEMICALS INC.

(72) Inventors: Helga De Velder, Ottignies-Louvain-la-Neuve (BE); Alain Leroy, Ottignies-Louvain-la-Neuve (BE); Jean Riviere, Ottignies-Louvain-la-Neuve (BE); Eckhard Rühle, Esslingen (DE)

(73) Assignee: HEXION INC., Columbus, OH (US)

( * ) Notice: Subject to any disclaimer, the term of this patent is extended or adjusted under 35 U.S.C. 154(b) by 377 days.

(21) Appl. No.: 14/374,824

(22) PCT Filed: Jan. 30, 2013

(86) PCT No.: PCT/EP2013/000290
§ 371 (c)(1),
(2) Date: Jul. 25, 2014

(87) PCT Pub. No.: WO2013/117308
PCT Pub. Date: Aug. 15, 2013

(65) Prior Publication Data
US 2015/0037561 A1 Feb. 5, 2015

(30) Foreign Application Priority Data

Feb. 6, 2012 (EP) .................................... 12075011
Dec. 19, 2012 (EP) .................................... 12008431

(51) Int. Cl.
C08L 63/00 (2006.01)
C08J 5/24 (2006.01)

(52) U.S. Cl.
CPC .............. C08L 63/00 (2013.01); C08J 5/24 (2013.01); C08G 2650/56 (2013.01); C08L 2201/54 (2013.01); Y10T 428/24994 (2015.04); Y10T 428/249921 (2015.04); Y10T 442/652 (2015.04)

(58) Field of Classification Search
CPC .......... C08L 63/00–10; C08L 2201/54; C08L 2203/12; C08G 2650/56; Y10T 428/249921; Y10T 428/249924; Y10T 428/24994; Y10T 428/249941–249952; B32B 5/00; B32B 5/022; B32B 5/12; B32B 5/22; B32B 5/24; B32B 5/26; B32B 5/28; B32B 17/00; B32B 17/02; B32B 17/04; B32B 17/064; B32B 17/10; B32B 17/10733; B32B 27/04; B32B 27/06; B32B 27/08; B32B 27/12; B32B 27/38; B32B 2255/02; B32B 2255/26; B32B 2260/02; B32B 2260/021; B32B 2260/046; B32B 2262/101; B32B 2363/00; D10B 2101/06
USPC ............................................ 428/292.1–301.4
See application file for complete search history.

(56) References Cited

U.S. PATENT DOCUMENTS

| 3,888,942 | A | | 6/1975 | Tsen | |
|---|---|---|---|---|---|
| 4,756,954 | A | * | 7/1988 | Berman | ............... C08G 59/066 428/209 |
| 5,403,869 | A | * | 4/1995 | Arike | ................... C08G 59/027 428/901 |
| 5,817,736 | A | * | 10/1998 | von Gentzkow | .. C08G 59/1488 528/108 |
| 6,090,729 | A | * | 7/2000 | Jonas | ....................... B32B 5/18 442/180 |
| 6,670,006 | B1 | * | 12/2003 | Sugimori | ............. C08G 59/226 428/36.9 |
| 7,166,491 | B2 | | 1/2007 | Wilson et al. | |
| 7,592,067 | B2 | | 9/2009 | Christiansen et al. | |
| 8,969,490 | B2 | | 3/2015 | Ohigashi et al. | |
| 2007/0299164 | A1 | | 12/2007 | Hayashi et al. | |
| 2008/0315164 | A1 | | 12/2008 | Wei | |
| 2009/0233094 | A1 | * | 9/2009 | Yokoe | .................... C08G 59/68 428/396 |
| 2010/0015431 | A1 | * | 1/2010 | Matsui | ............. B29C 66/82661 428/323 |
| 2010/0044087 | A1 | | 2/2010 | Fukuhara et al. | |
| 2011/0139496 | A1 | | 6/2011 | Nakamura | |
| 2014/0221552 | A1 | * | 8/2014 | Peters | .................... C08G 81/00 524/505 |
| 2017/0158806 | A1 | * | 6/2017 | Peters | .................. C08G 59/063 |

FOREIGN PATENT DOCUMENTS

| CA | 2108260 | 11/1992 |
|---|---|---|
| EP | 1947130 A1 | 7/2008 |
| EP | 2014721 A1 | 1/2009 |
| JP | 2002-67176 | 5/2002 |

OTHER PUBLICATIONS

Epikote 828 Technical Data Sheet, Feb. 2007.*
Epikote 1001 Technical Data Sheet, Feb. 2007.*
Epikote 1002 Technical Data Sheet, Sep. 2002.*
InChemRez Phenoxy Resins PHKB, PKHC, PKHH, PKHJ, http://www.brenntag.com/media/documents/bsi/product_data_sheets/material_science/gabriel_phenoxy_resins/pkhb_pkhc_pkh_h_pkhj_pds.pdf, accessed Dec. 14, 2016.*
Gabriel, Phenoxy Standard Solids Grades (Year: 2017).*

(Continued)

Primary Examiner — Jennifer A Steele

(57) ABSTRACT

This invention relates to epoxy resin formulations for preforms to be used in molding processes, especially resin transfer molding processes and to methods for preparing the performs. The epoxy formulation is based on liquid or solid epoxy resins blended, with medium to high molecular weight, phenoxy resins. These formulations are highly compatible with epoxy curable injection resins, and more over are reacted in the polymeric matrix, without reducing the glass transition temperature (Tg) of the cured composite material.

12 Claims, No Drawings

(56) References Cited

OTHER PUBLICATIONS

Hexion Epon 828 Technical Data Sheet; http://www.hexion.com/en-US/product/epon-resin-828 (Year: 2005).*
Gabriel Phnoxy Resins Technical Data Sheet; copyright 2018 Gabriel Performance Products (Year: 2018).*

* cited by examiner

BLENDS OF LIQUID EPOXY AND SOLID PHENOXY RESINS

RELATED APPLICATION DATA

This application claims the benefit of PCT Application PCT/EP2013/000290 with an International Filing Date of Jan. 30, 2013, published as WO 2013/117308 A1, which further claims priority to European Patent Application No. 12008431.4 filed Dec. 19, 2012, and European Patent Application No. EP 12075011.2 filed Feb. 6, 2012; the entire contents of all are hereby incorporated by reference.

This invention relates to epoxy resin formulations for preforms, textiles or preimpregnated textiles to be used in molding processes, especially resin transfer molding (RTM) processes such as Vacuum Assisted Resin Transfer Molding (VARTM) and to methods to preform the textile layers.

Preforms for resin RTM are typically composed of layers of oriented fiber material which are assembled and shaped prior to insertion into a mold for resin injection or directly into the mold. Resin is then injected into the mold to infiltrate between the fibers to fill out the composite part. This process for producing composite parts is known as "resin transfer molding".

In such a process, it is difficult to incorporate a layer of for example unidirectional fibers, because there is no way to maintain dry unidirectional fibers in register during preform assembly. It is also difficult to place the fibers in preform because of the tendency of the fibers to separate. Even if one were to successfully place a layer of dry unidirectional fibers in preform, it is likely that during resin injection, the fibers will separate and shift, thus reducing part strength, and making it difficult to maintain part to part consistency.

To overcome this problem, several systems were proposed such as: a preimpregnated unidirectional fiber preform was used which has a resin content of about 35 percent by weight. While sufficient to hold the fibers together, this preform failed to allow impregnation of the preform with the matrix resin during the molding process. On the other hand, a unidirectional fiber perform having a low resin content (3 to 5 percent by weight), such as that described in U.S. Pat. No. 5,496,602, was found to be difficult to handle, resulting in fiber breakage. A more recent EP1781455 suggested the use of a "hot melt" thermofusible rubber formulation.

The systems are always requiring temperature above 60° C. to lead to a flexible perform mat that could be adapted to a specific shape.

It would be desirable to provide a preform having a higher fiber cohesion with a resin content which is sufficient to hold the fibers, at room temperature, in the desired shape and position but small enough to leave the resulting preform porous so that it can be impregnated with matrix resin during subsequent molding processes even when the cure is done in a vacuum bag at low temperatures such as 60 to 100° C. Additionally, it would be desirable to provide a fiber preform having improved permeability and compatibility with respect to the RTM resin to reduce injection time and improve fiber wet out. Moreover, if the resin composition used to maintain the fiber, at room temperature, has adhesiveness it will be highly appreciated. This property will allow the preform to adhere temporarily to the mold or to other fiber layers during the assembly of a complex fiber-based material.

We have found that liquid or solid epoxy resins, blended with medium to high molecular weight, phenoxy resins could fulfill the above industry expectations. These formulations are highly compatible with epoxy curable injection resins, and more over are reacted in the polymeric matrix, without reducing the glass transition temperature (Tg) of the cured composite material. The presence of this liquid epoxy resin and phenoxy resin combination, with a Tg below room temperature, allows the injection-curable epoxy system to penetrate into all the interstices between the fibers during injection process. Moreover, the good solubility of the epoxy-phenoxy resins into the injection-curable epoxy system at room temperature minimizes the disturbance of the fiber orientations.

The liquid or solid epoxy resins suitable to be blended with a phenoxy resin are epoxy resins derived from a diglycidyl ether of biphenol, bisphenol, hydrocarbyl-substituted biphenol, hydrocarbyl-substituted bisphenol, phenol- or hydrocarbyl-substituted bisphenol-aldehyde novolac resin, unsaturated hydrocarbon-phenol or hydrocarbyl-substituted phenol resin. More preferably, the epoxy resin is a diglycidyl ether of Bisphenol A having an epoxide equivalent weight of from about 185 to about 3000 g/eq. Commercially available resins are Epikote 828, Epikote 834, Epikote 1001, Epikote 1002, Epikote 1004, Epikote 1009, Epikote 1010 (ex. Momentive Specialty Chemicals). Aliphatic epoxy resins could be used alone or in combination with the above liquid and solid epoxy resins.

The phenoxy resins, used in the present invention, are those based on advanced bis-phenol A glycidyl ether with bis-phenol A up to a molecular weight of 30 000 to 65 000 dalton, those resins are linear and terminated with phenolic function. This phenolic function is able to be incorporated in epoxy curable system. Commercially available phenoxy resins of this type are available at InChem Phenoxy Resin.

The phenoxy resins are supplied as a solution or as solid pellets; these could be formulated with epoxy resin as solventless, solventborne, high solids or waterborne systems. For the present invention solventless or waterborne systems are preferred, and the solventless is the most preferred.

The level of phenoxy resin on liquid or solid epoxy resin for the present invention is between 5 to 25 weight %, the preferred level is between 8 and 23 weight %, the most preferred level is between 10 and 20 weight %. As illustrated further in the examples the homogeneous blend of the phenoxy resins within the liquid epoxy resin is obtained by heating the liquid epoxy resin to a temperature above 90° C. during several minutes. This hot liquid blend can be deposited onto a release paper in a film form; this film can be stored on a roll at room temperature or below. This film can be stored for months with any change from the properties stand point.

The blend of phenoxy resin with the liquid or solid epoxy resin can be mixed with organic solvents to provide a solvent based formulation, which can be sprayed onto fiber mats, or any fiber cloths.

The blend of phenoxy resin with the liquid or solid epoxy resin can be mixed with water in presence of a surfactant to lead to a waterborne formulation; which can be sprayed onto fiber mats, or any fiber cloths. These treated fiber mats could be stored, at room temperature or below, when applied on a release paper foil and this for months without any changes.

The blend of phenoxy resin with the liquid or solid epoxy resin can be mixed with a curing agent and/or a curing catalyst. Curing agents of epoxy resins are well known in the art, and could be acid/anhydride functional compounds or amine/amide functional compounds or dicyandiamine derivatives or the like. The curing catalyst used for epoxy resin cure of the present invention is well documented in the literature. The prefer classes of catalyst are imidazole or imidazoline derivatives such as for example 2-methyl imidazole, 2-phenyl imidazole, 2-ethyl imidazole.

The level of the phenoxy resin over the curable epoxy infusion system must be below 15 weight %, preferably below 12 weight % and most preferably below or equal to 10 weight %, in order to have less than 5° C. difference on the measured Tg over the reference.

The level of the phenoxy resin-liquid epoxy resin over the fiber mat must be at least of 0.2 weight % and preferably not higher than 0.5 weight % to achieve the best balance between gluing performance and the Tg of the cured fiber composite matrix.

Test Method

Viscosity: ASTM D-2196 (with thermosel).
Loop Tack: FTM-9_FINAT test method n°9Technical handbook 2009.
Tg: DSC Perkin Elmer type 7, temperature range from −40 to 100° C., rate 5° C. by min.

EXAMPLES

Example 1

Blend of EP 834 (EPIKOTE™ Resin 834) and phenoxy resin PKHH (Ex InChem), the epoxy resin is placed in a reactor under nitrogen and heated until 100° C. and further to 160° C. under agitation, when reached the pellets of PKHH are gradually added. After 180-240 minutes the PKHH resin is completely dissolved into the epoxy resin. The table 1 below reports the ratio tried, the viscosities and the Tg.

For two blends we have measured the adhesive properties.

TABLE 1

|   | E 834 | PKHH | Visco @ 100° C. | Visco @ 120° C. | Visco @ 140° C. | Tg, ° C. | Loop tack @ room temp |
|---|---|---|---|---|---|---|---|
| A | 75 | 25 | — | — | 7500 | — | — |
| B | 80 | 20 | 26750 | 7250 | — | 18 | — |
| C | 85 | 15 | 10050 | 2750 | — | 8 | 2.980/3.303 |
| D | 90 | 10 | 2850 | 900 | — | 3 | 9.703/9.270 |

Visco measured with Brookfield and with Spindle 27, Tg measured by DSC condition see test method section.
Loop tack test in N/inch².
The films based on 1C and 1D were stored for more than 12 months on release paper at 23° C. without any changes in performance.

Example 2

The phenoxy resin-liquid epoxy resin blend as prepared according to 1D has been tested with a conventional infusion curable epoxy resin system RIMR135 (epoxy part) and RIMH137 (hardener part) (ex. Momentive Specialty Chemicals Inc.). In the Table 2 below the Tg is reported after a cure cycle of 5 hours at 80° C.

TABLE 2

| Weight % of 1D | Tg midpoint value, in ° C. |
|---|---|
| 0.0 | 84.10 |
| 0.5 | 81.05 |

TABLE 2-continued

| Weight % of 1D | Tg midpoint value, in ° C. |
|---|---|
| 5.0 | 81.34 |
| 10.0 | 79.01 |

Example 3

A fiber reinforcement is impregnated with the phenoxy resin-liquid epoxy resin of example 1D and cured with the infusion epoxy curable of Example 2.

The ratio organic matrix over the glass fiber is 40/60 on volume or 30/70 on weight.

For a glass fiber material of 800-1000 gram/m² the phenoxy resin-liquid epoxy resin of Example 1 is applied in proportion of 20-40 gram/m². No negative impact on mechanical properties has been observed.

We claim:
1. An epoxy resin formulation consisting essentially of a blend of:
   a solid phenoxy resin comprising an average molecular weight between 30000 to 65000 daltons, and
   a liquid epoxy resin selected from a diglycidyl ether of biphenol, bisphenol, hydrocarbyl-substituted biphenol, hydrocarbyl-substituted bisphenol, phenol- or hydrocarbyl-substituted bisphenol-aldehyde novolac resin, unsaturated hydrocarbon-phenol or hydrocarbyl-substituted phenol resin, with a level of the solid phenoxy resin on the liquid epoxy resin in the range of from 10 to 25 weight %, and with a level of the liquid epoxy resin on the solid phenoxy resin in the range of from 75 to 90 weight %, wherein the solid phenoxy resin comprises a linear resin terminated with phenolic functions and wherein the phenoxy resins are based on advanced bis-phenol A glycidyl ether with bis-phenol A; and
   a solvent,
   wherein the epoxy resin formulation does not contain a curing agent and/or a curing catalyst, and wherein the solvent is water.
2. The epoxy resin formulation of claim 1 wherein the solid phenoxy resin is present in an amount between 10 and 20 weight %.
3. A film based material comprising the epoxy resin formulation of claim 1.
4. A fiber based material comprising:
   the epoxy resin formulation of claim 1 and
   an infusion curable epoxy resin system comprising an epoxy resin and a curing agent and/or a curing catalyst.
5. The fiber based material of claim 4 wherein the fibers are placed in one direction per layer.
6. The fiber based material of claim 4 in contact with a curable infusion system.
7. The fiber based material of claim 6 wherein the infusion system is based on epoxy curable resins.

8. The epoxy resin formulation of claim 1 wherein the epoxy resin is a diglycidyl ether of Bisphenol A having an epoxide equivalent weight of from about 185 to about 250.

9. An epoxy resin formulation consisting of a blend of:
a solid phenoxy resin comprising an average molecular weight between 30000 to 65000 daltons,
a liquid epoxy resin selected from a diglycidyl ether of biphenol, bisphenol, hydrocarbyl-substituted biphenol, hydrocarbyl-substituted bisphenol, phenol- or hydrocarbyl-substituted bisphenol-aldehyde novolac resin, unsaturated hydrocarbon-phenol or hydrocarbyl-substituted phenol resin, with a level of the solid phenoxy resin on the liquid epoxy resin in the range of from 10 to 25 weight %, and with a level of the liquid epoxy resin on the solid phenoxy resin in the range of from 75 to 90 weight %, wherein the solid phenoxy resin comprises a linear resin terminated with phenolic functions and wherein the phenoxy resins are based on advanced bis-phenol A glycidyl ether with bis-phenol A; and
optionally a solvent.

10. The epoxy resin formulation of claim 9 wherein the solid phenoxy resin is present in an amount between 10 and 20 weight %.

11. The epoxy resin formulation of claim 9 wherein the epoxy resin is a diglycidyl ether of Bisphenol A having an epoxide equivalent weight of from about 185 to about 250.

12. The epoxy resin formulation of claim 9 wherein the solvent is water.

* * * * *